2,983,573

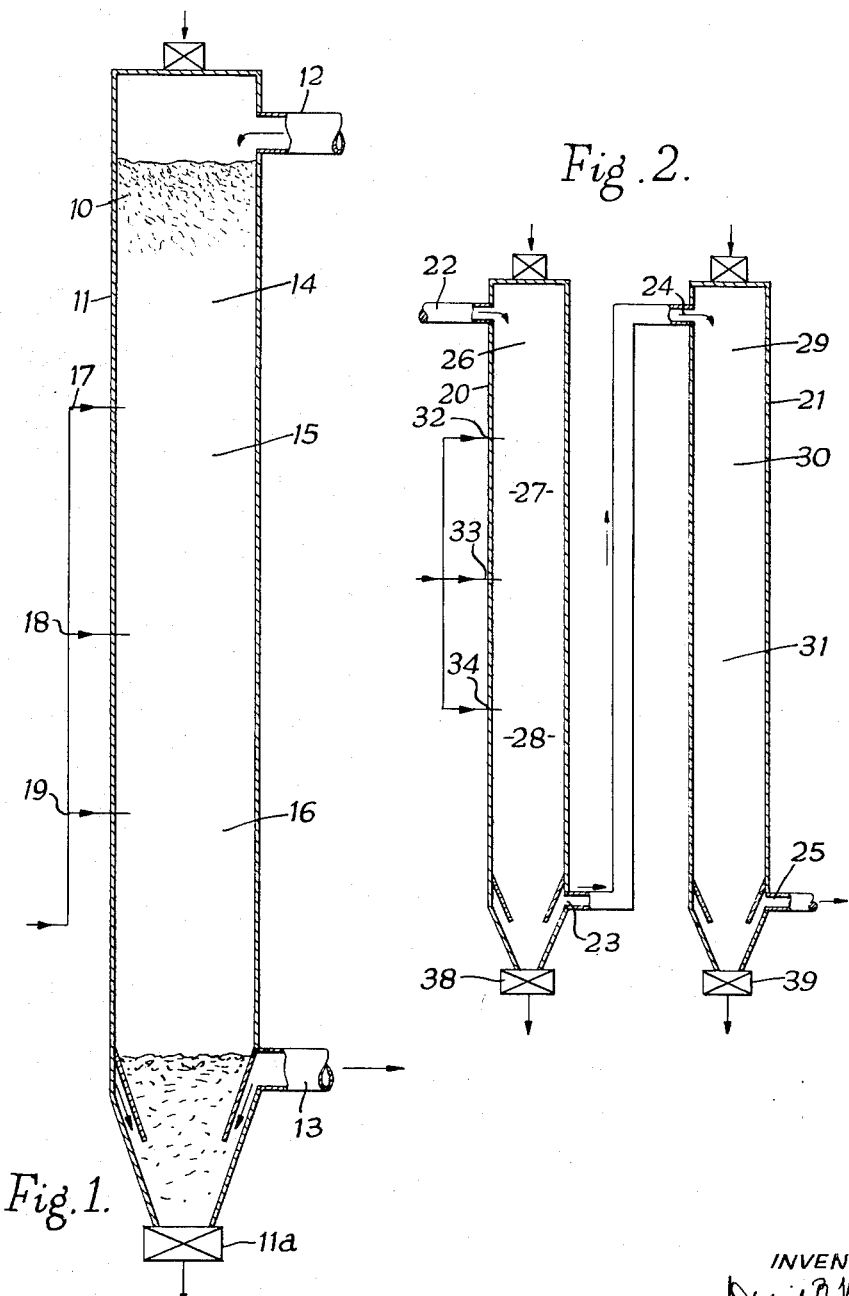

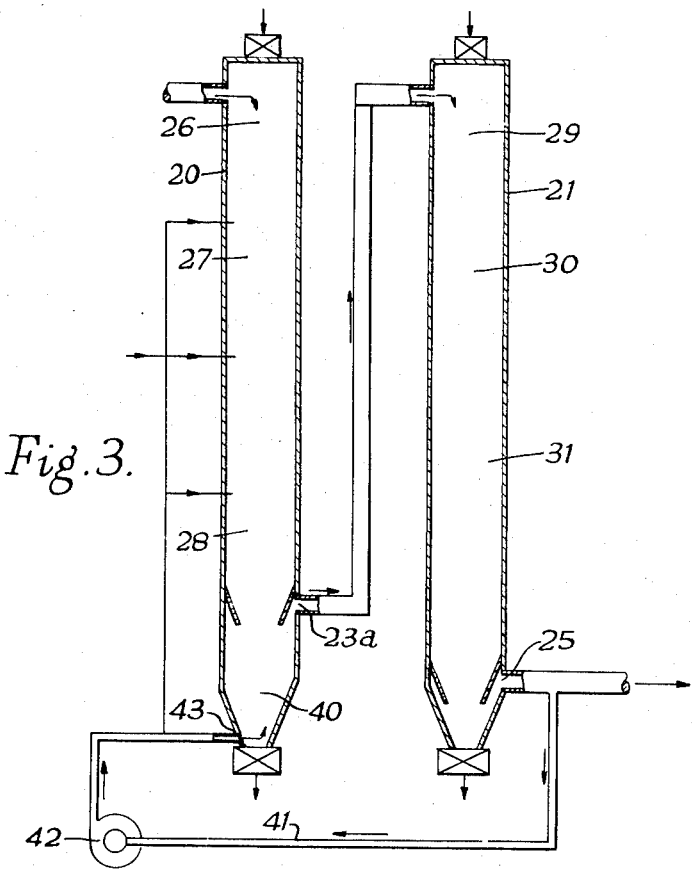
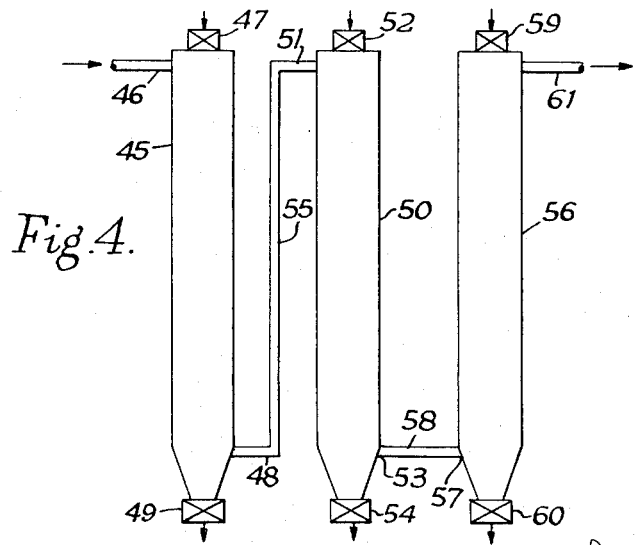

REMOVAL OF HYDROGEN SULPHIDE FROM GASES

David B. Moore, Craigmore, Brighouse, and Patrick S. L. Cook, The Ingrams, Elland, England, assignors to Robert Dempster and Sons Limited, Elland, England Filed June 25, 1956, Ser. No. 593,737

1 Claim. (Cl. 23—2)

This invention relates to the removal of hydrogen sulphide, hydrogen cyanide and the like from gases containing these impurities, by reaction with granular or moulded reagent containing hydrated iron oxide in one or more of its various forms. Such granular or moulded reagents are hereinafter termed "pellets" or "purifying material," it being understood that such material is free-flowing under its own weight.

The use of hydrated iron oxide for the removal of hydrogen sulphide, hydrogen cyanide and the like is well known and the basic reactions between hydrogen sulphide and iron oxide may be indicated by the following equations.

(1) $3H_2S + Fe_2O_3.H_2O = Fe_2S_3.H_2O$

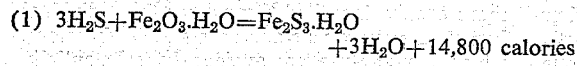
$+ 3H_2O + 14,800$ calories showing that iron sulphide and water are formed with the liberation of heat. This reaction is hereinafter termed "sulphiding."

In a further reaction, the iron sulphide reacts with oxygen to liberate elemental sulphur, while iron oxide is re-formed accompanied by the evolution of a larger amount of heat.

(2)

$Fe_2S_3.H_2O + \dfrac{3O_2}{2} = Fe_2O_3.H_2O + 3S + 144,000$ calories

This reaction is hereinafter termed "oxidation."

For many decades the use of loose "earth-like" iron oxides, either natural or specially prepared, has been generally adopted for the removal of hydrogen sulphide from gases; in this method the oxide is placed in shallow layers in large rectangular boxes, or more recently in circular or rectangular towers, and the gas is caused to pass through the layers in each box, the layers being either in a series or parallel arrangement, while several boxes are arranged in series. With this method the iron oxide is static, and after a period of time has to be removed from the container, either manually or by mechanical means, and the container recharged for further use.

More recently methods have been developed whereby the iron oxide is moved through containers, either continuously or intermittently, so avoiding the complete recharging of a container and the present invention relates to this type of plant using iron oxide in the free-flowing granular or moulded form. It is to be understood that the term "flow" when used herein in relation to the purifying material refers to the general movement of the material. In practice the material may remain stationary for a considerable period (e.g. a day) but will have a general flow when considered over a much longer period. More particularly the present invention relates to the method for carrying out the oxidation reaction as set forth in Equation 2 above.

Oxidation is essential to the satisfactory working of all types of purifying plant employing iron oxide, and the manner in which it is carried out substantially governs the degree of enrichment of the iron oxide with sulphur, the degree of hydrogen sulphide removal and the ease with which the process may be carried out having regard to the amount of materials to be handled. In prior processes using granular or moulded purifying material, oxidation is carried out by one or more of the following methods:

(a) The iron oxide is first sulphided in the container until sufficient hydrogen sulphide is no longer removed from the gas. The gas is then passed through a second container while oxygen or a gaseous mixture containing oxygen is passed through the first, returning the material to an oxidised condition. The iron oxide may then be re-used for the removal of hydrogen sulphide.

(b) The iron oxide is sulphided in the container and passes through the container at a rate such that it is fully sulphided when it reaches the bottom where it is discharged. Following discharge the sulphide is oxidised externally by contact with oxygen or other gas containing oxygen.

(c) Oxygen, or a gaseous mixture containing oxygen, is admixed with the gas to be purified of hydrogen sulphide and under these conditions the sulphiding and oxidation reactions take place, to a great extent simultaneously.

In prior processes using vertical tower like vessels containing moulded iron oxide, the gas passing in counter-current flow to the purifying material, it has been found that if the oxidation is carried out as in (a) then the slightly sulphided pellets in the upper sections of the container form a hard, non-porous layer of elemental sulphur which seriously reduces the capacity of the body of the pellets for further removing hydrogen sulphide. Further, this method requires at least one additional vessel for any given duty, since it is essential to isolate one vessel from the main gas stream in order to carry out the oxidation.

The necessity for providing an additional purifying tower may be avoided by using method (b) in which the pellets flow down the tower and are removed in a substantially sulphided condition. In this case, however, when the pellets are oxidised by exposure to air the heat may be excessive and even sufficient to cause ignition of the sulphur. To avoid this, the sulphided material is transferred to a separate vessel where the oxidation is controlled by limiting the amount of oxygen in the gas passing through the vessel, which gas normally being oxygen-depleted air may be recycled with intermediate cooling. This method again requires additional plant for the purpose of carrying out the oxidation.

Method (c) whereby the sulphiding and oxidation is carried out substantially simultaneously, is the ideal process. In practice however it has been found in prior processes utilising the tower type purifying plant and using moulded free-flowing oxide that many difficulties have made this ideal aim unattainable. The main obstacles in prior processes relate to the binding of the oxide pellets due to excessive heat generated, and to the decline in activity of the pellets due to sulphur skins being formed on new pellets following contact with small amounts of hydrogen sulphide.

The present invention relates to the apparatus for, and more particularly the method of achieving sulphiding and oxidation within the purifying tower, with the avoidance of excessive temperatures and the formation of sulphur skins.

According to this invention a process for the removal of hydrogen sulphide from gases comprises passing the gas substantially vertically downwards through a continuous compact column of granular or moulded material containing iron oxide, in concurrent flow to the movement of the purifying material, which material is intermittently or continuously withdrawn from the bottom of the column while fresh material is charged to the top of the column.

According to a feature of this invention a gas containing oxygen may be admitted to the column at a point or at points substantially below the level of the top of the column.

The gas containing oxygen may be introduced at a plurality of points at different levels of the column.

According to a still further feature of this invention the arrangement is such that the gas leaves the column at a point some distance above the bottom of the column and purified gas containing oxygen is passed upwardly through that part of the column which is below the gas outlet.

The process may be so arranged that the gas is passed through a plurality of continuous compact columns of purifying material, which columns are in series or in parallel or part in series and part in parallel.

Preferably the purifying material after removal from the bottom of a column is returned to the top of a preceding column. Alternatively the purifying material after removal from the bottom of a column may be returned to the top of the same column.

The purifying material after removal from a column may be subjected to a process for the removal of sulphur, and then returned to the top of a purifying column.

The process may be carried out under varying conditions such as for instance, a maintained pressure within the column or the application or removal of heat.

The invention also includes the provision of apparatus for carrying out the process. Accordingly there is preferably provided a tower-like vessel adapted to hold the purifying material and provided with means for admitting a gas containing oxygen at one point, or at a plurality of points at different levels.

Preferably two or more such towers are arranged in series so that the gas passes downwardly through the first tower and then downwardly through the succeeding tower or towers.

The first tower may be arranged with its gas outlet some distance above the bottom and a pipe leading from the outlet of a further tower in the series is connected to the bottom of the tower.

Alternatively, where two or more towers are arranged in series, the final tower of the series may be arranged for the gas to pass in counter-current flow to the purifying material, that is, the gas inlet may be disposed adjacent to the bottom of the said final tower, the gas outlet being adjacent to the top of the tower, the preceding tower or each preceding tower being arranged as described above with the gas passing in concurrent flow with the purifying material.

One method of carrying out the invention will now be described by way of example.

A granular or moulded reagent containing iron oxide is contained in a tower-like vessel so that it forms a continuous compact column occupying the whole of the cross-sectional area of the tower. The pellet reagent is caused to "flow" through the container or containers by the continuous or intermittent removal of material from the bottom thereof and by replacing an equal volume of fresh material to the top. It is understood that "fresh" purifying material refers to (1) Iron oxide pellets or granules that have been newly made or to (2) Such material that has been sulphided and subsequently oxidised or "re-oxidised" which therefore contains elemental sulphur but which is yet able to be sulphided again, or to (3) Material as in (2) which has undergone a process for the extraction of elemental sulphur and which is therefore substantially in a new condition.

The gas to be purified of hydrogen sulphide enters the tower-like vessel at the top and passes downwards in concurrent flow, with the pellets, leaving the vessel at or near the bottom. Oxidation is achieved by adding a gas containing oxygen to the gas in the tower at a point or points in the tower which is or are below the level of the main sulphiding zone which zone occurs at the top of the column. In this manner the fresh charge of oxide at the top of the tower is first brought into contact with gas containing a high proportion of hydrogen sulphide so that the material is substantially sulphided before it passes to the lower zone, where it is oxidised in the presence of the added oxygen. By this method oxidation may be carried out with a reduced tendency to produce a hard non-porous layer of sulphur on the pellets and the enrichment of the material with sulphur is increased. Furthermore, when using the method of intermittent removal and replacement of material to which the process is more suited (for example from once daily to five day intervals), the reoxidation of material in the lower zone of the tower renders the material in that part available for removing further quantities of hydrogen sulphide which will pass to it as the upper zone becomes more fully sulphided.

The present invention depends on the fact that a shallow layer of fresh pelleted material, when first charged to a tower will remove the greater part of the hydrogen sulphide from the gas for a limited period and not until the iron oxide has been substantially sulphided will any appreciable quantity of hydrogen sulphide pass through the layer. In the present invention therefore the iron oxide is completely or mainly converted into iron sulphide before it passes down to a zone where the added oxygen is present. During oxidation in this zone, sulphur is more evenly deposited throughout the individual pellets than with previous arrangements. Furthermore, zones of high temperature are avoided by substantially separating the two reactions and if necessary by spreading out the oxidation zone by the controlled admixture of a gas containing oxygen at two or more points.

The total volume of oxygen admitted to carry out the oxidation may be from 0.5 to 2.0% and normally in the order of 1 percent of the total gas volume, but this may be varied according to requirements.

Apparatus constructed according to the invention together with modifications will now be more fully described by way of example only, with reference to the accompanying drawings, in which:

Figure 1 is a diagrammatic view of a single gas purifying column,

Figure 2 is a diagrammatic view showing two gas purifying columns connected in series, Figure 3 is a view similar to Figure 2, but showing a modified arrangement, and Figure 4 is also a view similar to Figure 2, but showing a further modified arrangement employing three gas purifying columns.

Referring to the drawings, in Figure 1 purifying material 10 is contained in a tower-like vessel 11 through which gas containing 150 to 250 grains of hydrogen sulphide per hundred cubic feet passes from an inlet 12 to an outlet 13. The amount of fresh material added at the top and the corresponding amount of used material withdrawn at the bottom will generally be at the rate of 1 to 3 feet per day, but depends on the actual concentration of hydrogen sulphide and the volume of gas passing through the tower, both of which conditions will vary from time to time. The time of residence of the material within the tower would be of the order of 30 days, although the material would be removed in batches at shorter intervals of time.

In considering the following description it is understood that the process is being carried out using a daily intermittent charging and discharging of the tower. When the tower is freshly charged the foul gas entering at 12 will pass down through the column where in zone 14 the bulk of the hydrogen sulphide (about 95 percent) will be removed. During this initial period, which may last some eight to ten hours, zone 15 will be receiving only a small amount of hydrogen sulphide, and by comparison, a larger amount of oxygen supplied through one or more of points 17, 18 and 19. The sulphide from earlier periods of sulphiding will therefore be largely oxidised and after the initial period will be capable of removing the increasing quantities of hydrogen sulphide then passing from the zone 14. 16 is a zone where traces of hydrogen sulphide are removed and where the material is further reoxidised prior to discharging. It will be understood that the various zones do not have well defined boundaries but merge one into another to form a complete column.

In Figure 1, an outlet for purifying material is indicated diagrammatically at 11a, and this outlet may be of any convenient construction, it being understood that both charging and discharging arrangements would normally be in the form of a gas lock.

In Figure 2 gases containing approximately 500 grains of hydrogen sulphide per hundred cubic feet of gas, are passed through two towers 20 and 21 in series, entering the tower 20 at the point 22, leaving at 23, entering the tower 21 at the point 24 and leaving at the point 25. The second tower 21 of the series will always receive gas at a relatively low concentration of hydrogen sulphide (average 10 to 20 grains per 100 cubic feet) and the oxygen passing from the first tower would be adequate to oxidise the sulphide formed. The tower 20 has three zones 26, 27 and 28 corresponding with the zones 14, 15 and 16 of the tower 11 of Figure 1, whilst the tower 21 has no defined zones. The tower 20 has inlet points 32, 33, 34 for gas containing oxygen corresponding with the points 17, 18, 19 of the tower 11, and the towers also have outlets 38 and 39 respectively for discharge of the purifying material normally via special gas locks.

The tower 20 therefore removes approximately 490 grains of hydrogen sulphide per hundred cubic feet of gas. This it will do substantially as described for the single tower system, except that the lower zones 27 and 28 will receive larger amounts of hydrogen sulphide and will thus contain higher proportions of sulphide.

A modification of the arrangement of Figure 2 is shown in Figure 3, and like parts in these two figures are indicated by the same reference numerals. On account of the higher proportions of sulphide in the lower zones 27 and 28 of the tower 20, a fourth zone 40 is provided by the simple means of having the main outlet 23a for the gases at point above the bottom of the column, giving a zone equivalent to two days charge of material. Through this lower zone 40 a small proportion of the purified gas from the outlet 25 of the final tower 21 is recycled through a pipe 41 by means of a fan 42, and to which gas is added a further quantity of oxygen or gas containing oxygen, the said gas containing in the aggregate sufficient oxygen to substantially oxidise the sulphide remaining in the material in zone 40. This gas passes upwards through zone 40 from a point 43 near to the bottom of the column 20 and mixes with the main gas at or near the outlet 23a for the main gas stream. The amount of gas recycled would be generally of the order of 2% of the total gas passing through the plant and may contain up to 5% of oxygen by volume. This method ensures adequate oxidation before the material is discharged to the atmosphere, thus avoiding over-heating in the material followng exposure to the air.

It is understood that there is no definite limit to the proportion of hydrogen sulphide removed in the first tower; by an increased rate of movement of the column more hydrogen sulphide will be removed therein and in the limit the second tower would be used to remove only traces of hydrogen sulphide.

A modified arrangement employing three towers is shown in Figure 4, the first tower 45 having a gas inlet 46 at its upper end adjacent to an inlet for purifying material provided with a gas trap 47, a gas outlet 48 adjacent to its lower end, and an outlet with a gas trap 49 for the purifying material. The second tower 50 similarly having a gas inlet 51, inlet for purifying material with gas trap 52, gas outlet 53, and outlet for purifying material with gas trap 54. The outlet 48 of the tower 45 is connected by a pipe 55 to the inlet 51 of the tower 50. The third or final tower 56 has its gas inlet 57 adjacent to its lower end and connected by a pipe 58 to the outlet 53 of the tower 50. The purifying material inlet is at the top of the tower and has a gas check 59, the outlet for the purifying material being at the bottom of the tower and having a gas check 60, whilst the gas outlet 61 is adjacent to the top of the tower. With this arrangement, the gas passes successively through the towers 45 and 50 in concurrent flow with the purifying material, whilst in the final tower 56 the gas passes in countercurrent flow to the purifying material so that immediately prior to the final outlet 61 the gas passes through the relatively fresh purifying material in the upper portion of the tower. This arrangement therefore ensures more complete purification of the gas.

In another three tower system, not shown in the drawings, the first two towers in the system, either in series or in parallel, would both be similar to the tower 20 and would remove the bulk of the hydrogen sulphide while the final tower in series with the first two would be similar to the tower 21 and remove little more than traces.

Pellet movement between towers, in a system using more than one tower, may be effected in one of several ways. Generally the final tower in respect of the gas stream, will not require as much material per unit of time as the first or other towers. The final tower may therefore be supplied with a small amount of newly made material while the first or other towers will consume that which is discharged from the final tower together with material that has been previously used in the first or other towers and from which or from part of which the sulphur has been extracted. The actual mode of material movement between one tower and another will depend upon the actual operating conditions.

The formation of non-porous layers of sulphur around individual pellets or granules is minimised by the use of the invention, since fresh charges of material always meet gas containing a high content of hydrogen sulphide and a low proportion of oxygen.

Use of the invention also ensures that purifying material may be discharged to the atmosphere without any danger of overheating, and therefore additional plant for the oxidation of sulphided material is avoided.

We claim:

A process for the removal of acidic constituents from gases comprising passing the gases successively through at least two continuous compact columns of flowable material containing iron oxide, withdrawing purifying material from the bottom of each column, charging fresh material to the top of each column, discharging gas from a first column at an outlet some distance above the bottom of said column, passing purified gas with added oxygen upwardly from the bottom of said first column to said outlet, the gas to be purified in at least said first column being passed in concurrent flow with said purifying material.

References Cited in the file of this patent
UNITED STATES PATENTS

| | | |
|---|---|---|
| 2,121,733 | Cottrell | June 21, 1938 |
| 2,590,828 | Stengel | Mar. 25, 1952 |

FOREIGN PATENTS

| | | |
|---|---|---|
| 321,536 | Great Britain | Nov. 14, 1929 |
| 406,495 | Great Britain | Mar. 1, 1934 |
| 640,065 | Great Britain | July 12, 1950 |
| 697,204 | Great Britain | Sept. 16, 1953 |